2,944,081
DIPHENYL ALKYLENEDIAMINES AND METHODS OF PREPARING THE SAME

William Blythe Wright, Jr., Woodcliff Lake, and Robert Allis Hardy, Jr., Ridgewood, N.J., and Herbert Joseph Brabander, Pearl River, N.Y., assignors to American Cyanamid Company, New York, N.Y., a corporation of Maine No Drawing. Filed Mar. 14, 1958, Ser. No. 721,347

10 Claims. (Cl. 260—562)

This invention relates to new organic compounds. More particularly, it relates to substituted alkylene diamines and methods of preparing the same.

In the past, numerous substituted ethylene diamines have been prepared. For example Chemical Abstracts 43, 593C, described N-(3-diethylaminopropyl)-formanilide. This compound and closely related compounds described in the prior art are inactive as analgesics when tested as hereinafter described.

We have found that compounds having the following structure are, in general, active as analgesics:

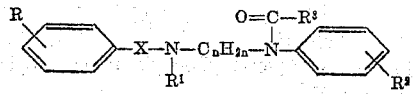

in which R is hydrogen, halogen, lower alkoxy, hydroxy, lower alkanoyloxy, lower alkyl, nitro, amino or a lower alkanoylamino radical, $R^1$ and $R^3$ are lower alkyl radicals, $R^2$ is hydrogen, lower alkyl, halogen, lower alkoxy, hydroxy or a lower alkanoyloxy radical, X is a divalent hydrocarbon radical of 1–4 carbon atoms, n is an integer of from 2–4 and acid addition salts thereof.

The present compounds containing nitrogen atoms will form acid addition salts which are generally crystalline solids, as shown in the examples hereinafter.

The compounds of the present invention are, in general, liquids at room temperature, which are relatively insoluble in water, but soluble in most organic solvents. They form salts with mineral acids which are soluble in water and alcohol, but relatively insoluble in ether.

The present compounds can be prepared by several different methods. A convenient method is by the acylation of the substituted ethylene diamines with an acylanhydride or acylhalide. When the acylating agent is a liquid, the reaction can be carried out by heating with the substituted ethylenediamine. The reaction can be carried out, for example, by heating on a steam bath for one to six hours.

The compounds of the present invention can also be prepared by reacting a substituted acylamide with a basic alkylene halide.

A still further method for preparing compounds of the present invention is the alkylation of an N-(aminoalkylene) anilide. This can be carried out by reaction with an aralkyl halide such as benzyl chloride, p-fluorobenzyl chloride, p-methoxybenzyl chloride, p-nitrophenethyl bromide, phenethyl chloride, m-methylphenethyl chloride and the like or by reductive alkylation with an appropriate aldehyde such as benzaldehyde, phenylacetaldehyde, cinnamaldehyde, m-methylbenzaldehyde, p-chlorophenylacetaldehyde and the like.

The following table describes a representative group of compounds which can be prepared by the examples described hereinafter.

TABLE I

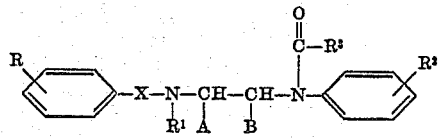

| X | A | B | R | $R^1$ | $R^2$ | $R^3$ | B.P. °C. (mm.) | Salt | Salt M.P., °C. | Procedure of example |
|---|---|---|---|---|---|---|---|---|---|---|
| —CH$_2$— | H | H | H | methyl | H | methyl | 152–155(0.2) | HCl | 204–205 | 1 |
| —CH$_2$— | H | H | H | do | H | ethyl | 165–170(0.6) | HCl | 179–181 | 2 |
| —CH$_2$— | H | H | H | do | H | propyl | 166–170(0.4) | HCl | 117–118 | 3 |
| —CH$_2$— | H | H | H | do | H | isopropyl | 140–144(0.3) | HCl | 200–202 | 4 |
| —CH$_2$— | H | H | H | do | m-chloro | ethyl | 165–170(0.1) | HCl | 166–168 | 2 |
| —CH$_2$— | H | H | H | do | m-methoxy | do | 182–186(0.4) | HCl | 123–125 | 2 |
| —CH$_2$— | H | methyl | H | do | H | do | 160–162(0.4) | HCl | 163–164 | 2 |
| —CH$_2$— | methyl | H | H | do | H | do | 166–170(0.4) | HCl | 149–151 | 2 |
| —CH$_2$— | do | H | p-bromo | do | H | do | 190–195(0.05) | | | 6 |
| —CH$_2$— | do | H | m-methyl | do | H | do | 140–146(0.05) | HCl | 150–151 | 6 |
| —CH$_2$— | do | H | p-methyl | do | H | do | 160–164(0.1) | | | 6 |
| —CH$_2$— | do | H | p-methoxy | do | H | do | 165–175(0.2) | | | 6 |
| —CH$_2$— | do | H | p-fluoro | do | H | do | 140–144(0.07) | HCl | 161–163 | 6 |
| —CH$_2$— | do | H | o-fluoro | do | H | do | 160–165(0.1) | HCl | 146–148 | 6 |
| —CH$_2$— | do | H | o-chloro | do | H | do | 165–170(0.1) | | | 6 |
| —CH$_2$— | do | H | p-chloro | do | H | do | 183–188(0.1) | HCl | 170–171 | 6 |
| —CH$_2$CH$_2$— | H | methyl | H | do | H | do | 155–160(0.2) | HCl | 125–127 | 2 |
| —CH$_2$CH$_2$— | H | do | H | do | H | propyl | 165–170(0.2) | HNO$_3$ | 103–105 | 3 |
| —CH$_2$CH$_2$— | methyl | H | H | do | H | methyl | 144–150(0.08) | HCl | 126–128 | 1 |
| —CH$_2$CH$_2$— | do | H | H | do | H | ethyl | 174–178(0.5) | Sulfate | 110–111 | 2 |
| —CH$_2$CH$_2$— | do | H | H | do | H | propyl | 165–170(0.2) | do | 90–91 | 3 |
| —CH$_2$CH$_2$— | do | H | H | do | H | isopropyl | 148–155(0.08) | do | 158–159 | 4 |
| —CH$_2$CH$_2$— | do | H | H | do | H | butyl | 156–162(0.08) | do | 117–119 | 5 |
| —CH$_2$CH$_2$— | do | H | H | do | m-chloro | ethyl | 180–185(0.2) | HCl | 121–123 | 2 |
| —CH$_2$CH$_2$— | do | H | H | do | m-methoxy | do | 205–210(0.5) | HCl | 133–134 | 2 |
| —CH$_2$CH$_2$— | do | H | H | do | m-propionoxy | do | 200–205(0.1) | | | 2 |
| —CH$_2$CH$_2$— | do | H | H | ethyl | H | do | 180–185(0.2) | Sulfate | 156–157 | 2 |
| —CH$_2$CH$_2$— | do | H | p-amino | methyl | H | do | 210–220(0.2) | | | 12 |
| —CH$_2$CH$_2$— | ethyl | H | H | do | H | do | 170–175(0.1) | | | 2 |
| —CH$_2$CH$_2$— | methyl | H | p-propionamido | do | H | do | 250–260(0.1) | | | 13 |
| —CH$_2$CH$_2$CH$_2$— | H | H | H | do | H | do | 160–170(0.2) | | | 13 |
| —CH$_2$(CH$_2$)$_2$CH$_2$— | methyl | H | H | do | H | do | 160–165(0.07) | | | 13 |
| —CH$_2$(CH$_2$)$_2$CH$_2$— | do | H | H | do | H | do | 170–175(0.1) | | | 2 |
| —CH=CH—CH$_2$— | do | H | H | do | H | do | 170–176(0.2) | | | 14 |

The present compounds are active analgesics when measured by the mouse hot plate method described by Wolfe and McDonald (J. Pharmacol. Exptl. Therap. 80, 300–307), with modifications.

Compounds are suspended in 2% aqueous starch and administered subcutaneously to a group of three mice at a dosage of 50 mg./kg. These mice are then individually placed upon the top enclosed surface of a copper bath maintained at 59°±0.5° C. by a boiling acetone-ethyl acetate mixture. The response to this presumably painful heat stimulus is either a licking of the paws or an attempt to jump from the plate. The response time is measured four times for each mouse at fifteen minute intervals following administration. The criterion of analgesia is a 100% increase in response time over control. Established clinically active analgesics such as meperidine, codeine, etc., are active in the above test.

When mixed with suitable excipients or diluents, they can be prepared as pills, capsules, tablets, powders and the like for unit dosage and to simplify administration. As analgesics they will relieve pain by direct action on nerve centers or by diminishing the conductivity of the sensory nerve fibers.

The following examples are illustrative of the general methods of preparing the compounds listed in the table.

Example 1

A mixture of 37 parts of $N^1$-benzyl-$N^1$-methyl-$N^2$-phenylethylenediamine and 75 parts by volume of acetic anhydride is heated on the steam bath for three hours and then distilled. The portion which distills at 152°–155° C. (0.2 mm.) is N-[2-(benzylmethylamino)-ethyl]-acetanilide. The yield is 91%.

The hydrochloride salt is prepared by the addition of alcoholic hydrogen chloride to the ether solution of the base. The hydrochloride melts at 204–205° C.

Example 2

A mixture of 14.8 parts of $N^1$-(p-ethylphenyl)-$N^2$-methyl-$N^2$-phenethyl-1,2-propanediamine and 20 parts by volume of propionic anhydride is heated on the steam bath for three hours and then distilled. On distillation, p-ethyl-N-[2-methylphenethylamino)propyl] - propionanilide is obtained.

Example 3

A mixture of 13.4 parts of $N^2$-methyl-$N^2$-phenethyl-$N^1$-phenyl-1,2-propanediamine and 25 parts by volume of butyric anhydride is heated on the steam bath for three hours and then distilled. The yield of N-[2-(methylphenethylamino)propyl]butyranilide, which boils at 165–170° C. (0.2 mm.) is 78%. The sulfate is prepared by the addition of sulfuric acid to a solution of the base and melts at 90–91% C.

Example 4

When isobutyric anhydride is substituted for butyric anhydride in the procedure of Example 3, N-[2-(methylphenethylamino)propyl]-isobutyanilide is obtained in 81% yield.

Example 5

When valeric anhydride is substituted for butyric anhydride in the procedure of Example 3, N-[2-(methylphenethylamino)propyl]valeranilide is obtained in 81% yield.

Example 6

A mixture of 3.6 parts of p-fluorobenzyl chloride, 11.0 parts of N-(2-methylaminopropyl)propionanilide and 30 ml. of ethanol is heated on the steam bath for eighteen hours. The solution is concentrated to a syrup, 10 parts of water are added, and the oil which separates is extracted with ether and distilled. N-[2-(p-fluorobenzylmethylamino)propyl]propionanilide is collected at 140–144° C. (0.07 mm.)

The hydrochloride is obtained by treating the above oil with ethanolic hydrogen chloride and ether.

Example 7

When 3.8 parts of p-ethylbenzyl chloride is substituted for p-fluorobenzyl chloride in the procedure of Example 6, N - [2-(p-ethylbenzylmethylamino)propyl]propionanilide is obtained.

Example 8

A mixture of 5.2 parts of m-[2-(benzylmethylamino)ethylamino]phenol, 1.4 parts of propionyl chloride and 16 parts of benzene is heated on the steam bath for 90 minutes and then concentrated to remove the solvent. The residue is made alkaline with dilute sodium hydroxide and the mixture is extracted with ether. The ether layer is dried over magnesium sulfate. The N-[2-(benzylmethylamino)ethyl]-m-hydroxypropionanilide is collected by distillation under reduced pressure.

Example 9

A mixture of 27 parts of $N^2$-(p-hydroxybenzyl)-$N^2$-methyl-$N^1$-phenyl-1,2-propanediamine, 4.6 parts of propionyl chloride, and 50 parts of benzene is heated on the steam bath for one hour and then concentrated to remove the solvent. The residue is made alkaline with dilute sodium hydroxide and then extracted with ether. On distillation, N - [2 - (p-hydroxybenzylmethylamino)propyl]-propionanilide is obtained.

Example 10

If an excess of propionic anhydride is substituted for the propionyl chloride in the procedure of Example 8, N-[2-(methyl-p-propionoxybenzylamino)propyl]propionanilide is obtained.

Example 11

A mixture of 29.9 parts of p-nitrophenethyl bromide, 21.7 parts of $N^1$-methyl-$N^2$-phenylethylenediamine, 30.7 parts of sodium carbonate and 150 ml. of toluene is refluxed for 20 hours and then treated with 100 parts of water. The toluene layer is separated and an aqueous layer is extracted with ether. The organic layers are combined, dried over magnesium sulfate and concentrated to remove the solvent. The residue is heated on the steam bath for three hours with 30 parts of propionic anhydride and then concentrated. The residue is treated with 32.5 parts of 4 N hydrochloric acid and the mixture is extracted twice with ether to remove unwanted by-products. The aqueous layer is made alkaline with dilute sodium hydroxide and again extracted with ether. The ether is removed to obtain the the product N-[2-(methyl-p-nitrophenethylamino)ethyl]propionanilide.

Example 12

A mixture of 14.2 parts of N-[2-(methyl-p-nitrophenethylamino)ethyl]propionanilide obtained by the procedure described in Example 11, 40 parts by volume of 1 N hydrochloric acid, 100 parts by volume of ethanol and two parts of 10% palladium on carbon catalyst is shaken in a Parr hydrogenator under three atmospheres of hydrogen pressure for three hours. The mixture is filtered and the filtrate is concentrated and extracted with chloroform. The residue is made alkaline with 5 N sodium hydroxide and then extracted with ether. The ether layer is distilled and the N-[2-(p-aminophenethylmethylamino)ethyl]propionanilide is collected at 210–220° C. (0.2 mm.).

Example 13

A mixture of 5.3 parts of trans-cinnamaldehyde, 10.1 parts of N - (2 - methylaminopropyl)propionanilide, 60 parts by volume of ethanol and 1.0 part of 10% palladium on carbon catalyst is shaken in a Parr hydrogenator under three atmospheres of hydrogen pressure for 80 minutes. The catalyst is filtered off, and the filtrate is concentrated to a syrup and made alkaline with sodium hydroxide. The reaction mixture is extracted with ether, and the ether layer is distilled. The product, N-[2-(methyl-3-phenylpropylamino)propyl]propionanilide, is collected at 160–165° C. (0.07 mm.).

*Example 14*

A mixture of 8.4 parts of chloropropenylbenzene, 11 parts of N-(2-methylaminopropyl)propionanilide, 100 parts by volume of ethanol and 10 parts by volume of pyridine is heated at reflux for 20 hours and then concentrated to remove the solvent. The residue is diluted with water and the oil which separates is extracted with ether and distilled. The product, N-[2-cinnamylmethylamino)propyl]propionanilide, boils at 170°–176° C. (0.2 mm.).

*Example 15*

A mixture of 13.4 parts of $N^3$-methyl-$N^3$-phenethyl-$N^1$-phenyl-1,3-propanediamine and 25 parts of propionic anhydride is heated on the steam bath for three hours and then distilled. The N-[3-(methylphenethylamino)propyl]propionanilide is collected at 168°–172° C. (0.2 mm.).

We claim:

1. A compound of the group consisting of those having the general formula:

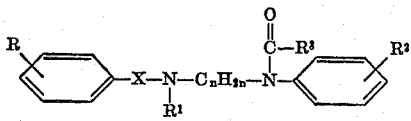

in which R is a member of the group consisting of hydrogen, halogen, lower alkoxy, hydroxy, lower alkanoyloxy, lower alkyl, nitro, amino, and lower alkanoylamino, $R^2$ is a member of the group consisting of hydrogen, lower alkyl, halogen, lower alkoxy, hydroxy, and lower alkanoyloxy, $R^1$ and $R^3$ are lower alkyl radicals, X is a divalent hydrocarbon radical of 1–4 carbon atoms, $n$ is an integer of from 2–4 and non-toxic acid addition salts thereof.

2. The compound N-[2-(methylphenethylamino)-propyl]propionanilide.

3. The compound N-[2-(methylphenethylamino)-propyl]propionanilide sulfate.

4. The compound N-[2-(benzylmethylamino)-propyl]propionanilide.

5. The compound m-methoxy-N-[2-(methylphenethylamino)propyl]propionanilide.

6. N-[2-(p-chlorobenzylmethylamino)propyl]-propionanilide.

7. N-[2-(p-methylbenzylmethylamino)propyl]-propionanilide.

8. N-[2-(m-methylbenzylmethylamino)propyl]-propionanilide.

9. N-[2-(cinnamylmethylamino)propyl]propionanilide.

10. N-[3-(methylphenethylamino)propyl]propionanilide.

References Cited in the file of this patent

UNITED STATES PATENTS

| | | |
|---|---|---|
| 1,534,525 | Hartman et al. | Apr. 21, 1925 |
| 1,926,015 | Rosenmund | Sept. 5, 1933 |
| 2,654,758 | Papa | Oct. 6, 1953 |
| 2,670,373 | Cusic | Feb. 23, 1954 |
| 2,670,374 | Cusic | Feb. 23, 1954 |
| 2,746,992 | Goldberg | May 22, 1956 |
| 2,851,466 | Fancher | Sept. 9, 1958 |

FOREIGN PATENTS

| | | |
|---|---|---|
| 172,748 | Japan | May 22, 1946 |

OTHER REFERENCES

Svensh Kem. Tid. 58, p. 327 (1946).